March 8, 1949.　　　　J. FIORELLA　　　　2,463,684
VINEYARD HOE
Filed July 29, 1946
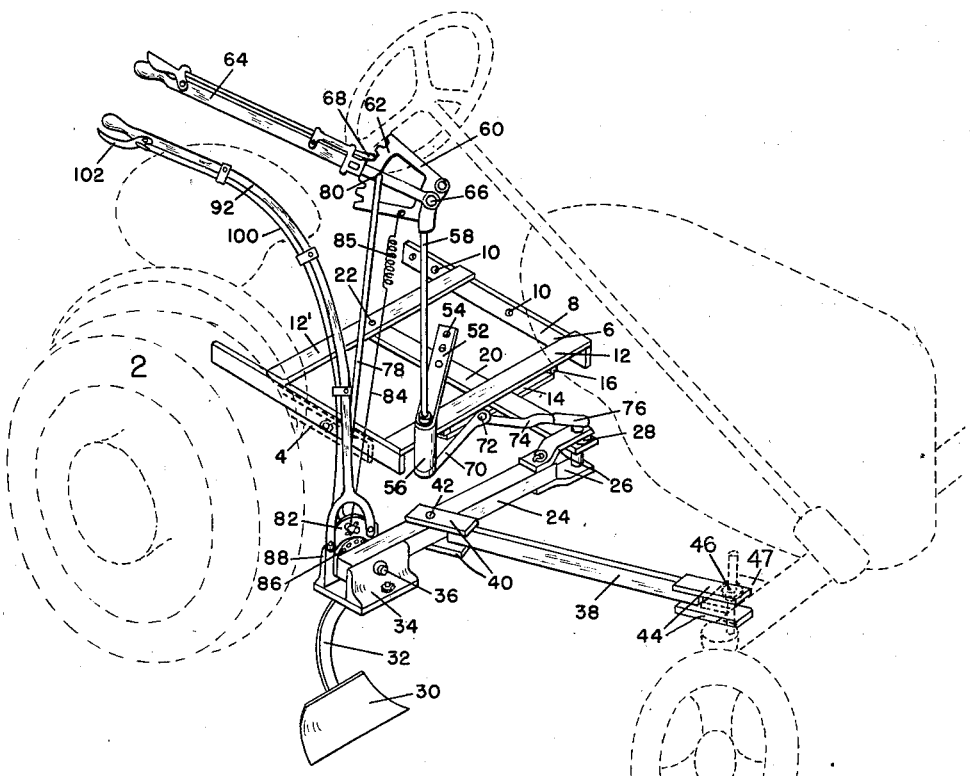
Fig. 1
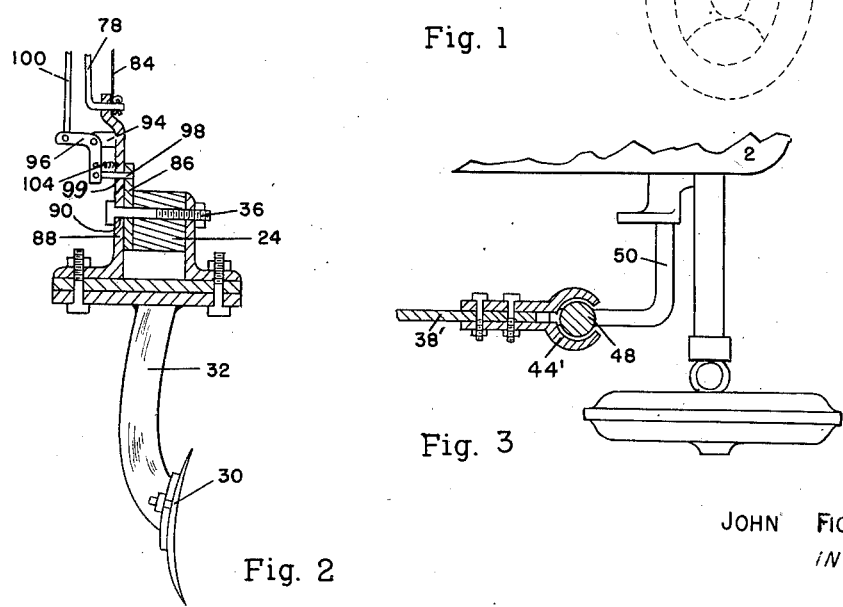
Fig. 2
Fig. 3
JOHN FIORELLA
*INVENTOR*
BY *James H. Littlepage*

Patented Mar. 8, 1949

2,463,684

UNITED STATES PATENT OFFICE 2,463,684

VINEYARD HOE

John Fiorella, Ripley, N. Y.

Application July 29, 1946, Serial No. 686,809

5 Claims. (Cl. 97—137)

This invention relates to hoe attachments for tractors and, more particularly, but not exclusively, to a hoe attachment having particular utility in vineyards.

The primary object of the invention is to provide a hoe attachment for a standard tractor for removing sod from around grape vines, in which process the sod, piled up soil, and weeds are pulled away from the bases of the vines. In accordance with this objective, it is intended to provide a hoe attachment having a blade normally operating in front of and somewhat to the outer side of a rear wheel of a tractor. In this position, the hoe blade is to the side of the path of the tractor and in full view of the operator so that he may observe the blade during close work.

More specific objects are the provision of a hoe and conjunctive supporting apparatus, the latter including mechanism enabling manual adjustment of the hoe by the operator of the tractor while the hoe is in operation. By manipulation of the adjusting apparatus, it is intended to provide for the raising and lowering of the hoe, for the variation of the blade angle, for inward and outward movement of the blade and, if desired, for tipping the blade.

These and other objects will be apparent in the following specification and claims, in which:

Fig. 1 is a perspective view showing the device as applied to a tractor;

Fig. 2 is a side elevation, partly in vertical section, showing a detail; and

Fig. 3 is a plan view, partly in horizontal section, showing an alternate front end arrangement.

Referring now to drawings in which like reference numerals denote similar elements, a tractor 2 having the usual under-carriage including a wheel flange plate 4 is disclosed for purposes of illustration, it being understood that any one of a number of conventional tractors may be utilized as the vehicle for the inventive structure. The unit adapted for installation on such a tractor includes a frame 6 having longitudinal members 8 bored at 10 for bolting to wheel flange plates 4, the frame further including transverse members 12, 12'.

A transverse strip 14 is secured by spacers 16 to the underside of the forward transverse member 12 so as to define an elongated slot 18 in which rides a tongue 20 pivoted at 22 to the rear transverse member 12'. A bar 24 having leg members 26 at its inner end, is pivoted at 28 to the front end of tongue 20. Bar 24 carries, on its outer end, a hoe blade 30 secured thereto by an arm 32, rigid with blade 30 and connected to its upper end with a U shape coupling shoe 34 pivoted to bar 24 by pivot bolt 36.

A rod 38 having leg members 40 at its rear end embracing bar 24 is connected by pivot 42 to bar 24. The front end of rod 38 is also provided with leg members 44 embracing a member 47 which is rigid with the undercarriage at the front end of the tractor, leg members 44 being connected to member 47 by a pivot 46. This frontal connection may partake various forms in alternate arrangements, by illustration in Fig. 3 wherein the front end of rod 38' is provided with a socket 44' for universal connection with a ball 48 on the free end of a curved arm 50, the arm being affixed at its inner end to the tractor.

The control elements for the hoe include a brace 52 suitably bored, as at 54, for bolting to the undercarriage of the tractor so as to lie well above the forward transverse frame member 12. The free end of brace 52 supports a bearing 56 which, in turn, rotatably supports vertical shaft 58 having a rack 60 on its upper end, the rack including a set of teeth 62. A lever 64 pivoted at its front end 66 to rack 60 carries a detent 68 of the type well known in the art for selective engagement with teeth 62 for purposes detailed hereinafter.

It is thus seen that shaft 58 is the primary support for lever 64. When blade 30 is raised, the outer end of bar 24 is supported entirely by lever 64. Under working conditions, when detent 68 is disengaged from teeth 62, blade 30 tends to seek its own level in the soil so that support thereof is not needed and so long as the detent remains disengaged, the effective weights of lever 64 and the operator's hand rest on blade 30 via link 78 and the associated elements.

The lower end of shaft 58 has rigidly affixed thereto an arm 70 connected by pivot 72 to a rod 74 serially connected by a knuckle joint 76 to the top end of pivot 28, it being apparent that the swinging of lever 64 will swing arm 70 to push or pull rod 74, thereby to swing tongue 20 to the left or right as the case may be. The swinging of tongue 20 correspondingly swings bar 24 inwardly or outwardly likewise to move hoe blade 30 inwardly or outwardly with respect to the tractor.

Hoe blade 30 is vertically supported through link 78 connected at its upper end 80 to lever 64 and at its lower end 82 to the rear plate 88 of coupling shoe 34 so that when detent 68 is withdrawn from teeth 62, raising and lowering of lever 64 will correspondingly raise and lower hoe blade 30. The play in the various connections between the movable members associated with blade 30 is such as to allow vertical movement of the outer end of bar 24. If desired, the blade 30 and associated parts may be counterbalanced by cable 84 connected at its lower end to plate 88 and connected through tension spring 85 to rack 60. This counterbalance has an additional function, also, in that link 78, detent 68 or lever 64 may be disconnected to eliminate positive vertical control so as to allow blade 30 and its associated parts to hang, this operation being sometimes advantageous in working loose or sandy soil.

An apertured plate 86 affixed near the outer end of bar 24 is arranged for sliding engagement with rear plate 88 of coupling shoe 34, rear plate 88 being provided with an aperture 90 for pivot 36 to pass through. An arm 92 having its lower end affixed to rear plate 88 is provided for rotating shoe 34, thereby to swing and tip blade 30 from side to side. As detailed in Fig. 2, rear plate 88 carries a rearwardly extending bracket 94 which supports lever 96, having its lower end pivoted to a pin 98 which slides through aperture 99 in plate 88 and which is selectively engageable with the apertures in plate 86, there being a cable 100, lever 102, and spring 104 for operating pin 98 as will be apparent to those skilled in the art. Accordingly, when pin 98 is withdrawn, arm 92 may be swung from side to side so as to tip blade 30. It is apparent that in the instances where tipping of blade is not frequently desired, and the operating mechanism for pin 98 may be eliminated. In such instances pin 98 may be manually withdrawn and blade 30 may be swung to the desired position of tipping and so maintained by reinsertion of pin 98.

It is manifest that various alternative arrangements of the links, levers and arms may be provided and that other modifications and adaptations will suggest themselves to those skilled in the art and having benefit of the above disclosure, which is illustrative of the invention defined by the following claims.

I claim:

1. In combination, a frame adapted for connection to the undercarriage of a tractor, a tongue adapted to extend generally lengthwise of the tractor and being pivoted to said frame for swinging transversely of the tractor, a bar pivoted to said tongue and extending outwardly therefrom to the front of a rear wheel of the tractor, a hoe blade supported on the outer end of said bar, a rotatable shaft extending upwardly from said frame, a lever, a pivot connecting said lever and said shaft for vertical swinging of said lever with respect to said shaft, linkage connecting the lower end of said shaft and said bar for adjusting said bar and hoe blade inwardly and outwardly with respect to the tractor upon rotation of said shaft and lever, and linkage connecting said lever and said bar for adjusting said bar and hoe blade vertically upon vertical movement of said lever with respect to said shaft.

2. In the combination claimed in claim 1, a member extending forwardly from said bar, pivot means pivoting the rear end of said member to said bar, and pivot means for pivoting the front end of said member to the front portion of said tractor.

3. In combination, a frame adapted for attachment to the undercarriage of a tractor, a bar having inner and outer ends, and being adapted to extend generally transverse to the fore-and-aft axis of the tractor, an earthworking tool carried by said outer end and adapted to be supported thereby in front of a rear wheel of said tractor, the inner end of said bar being movably connected to said frame for shifting inwardly and outwardly of said tractor and for swinging movement of said bar upwardly and downwardly, a vertical shaft rotatably mounted on said frame, operative connections between said bar and shaft whereby, upon rotation of said shaft said bar is shifted, a lever, horizontal pivot means connecting said shaft and lever whereby, upon horizontal swinging of said lever said shaft is rotated, and linkage connecting said lever and said bar whereby the outer end of said bar is lifted upon vertical swinging at said lever.

4. In combination, a frame adapted for attachment to the undercarriage of a tractor, a tool support adapted to be carried by said frame at one side of the tractor, said support being movably connected to said frame, the connection between said support and frame being such that said support may be shifted inwardly and outwardly of the tractor and swung upwardly and downwardly, an operating member, means mounting said member on said frame for movement in first and second planes, first means connecting said member and said support for shifting of the latter upon movement of said member in the first plane, and second means connecting said member and said support for swinging of the latter upon movement of said member in the second plane.

5. In combination, a frame adapted for attachment to the undercarriage of a tractor, a tool support having inner and outer ends and being adapted to extend generally transverse to the fore-and-aft dimension of the tractor and being adapted to support an earthworking tool on the outer end, a movable connection between said support and said frame including pivot means whereby said support may be swung upwardly and downwardly, said connection also including means whereby said support may be shifted laterally inwardly and outwardly of said tractor, linkage connecting the outer end of said support to the front portion of said tractor for preventing substantial fore-and-aft movement of said support, a single control element, means mounting said element on said frame for movement in first and second planes, and means connecting said element and said support for shifting said support in response to movement of said element in said first plane and for swinging of the support in response to movement of said element in the second plane.

JOHN FIORELLA.

REFERENCES CITED

The following references are of record in the file of this patent:

UNITED STATES PATENTS

| Number | Name | Date |
| --- | --- | --- |
| 461,290 | Taylor | Oct. 13, 1891 |
| 482,919 | Gedeohn | Sept. 20, 1892 |
| 550,622 | Kellogg | Dec. 3, 1895 |
| 1,360,014 | Onstott | Nov. 23, 1920 |
| 1,474,213 | Svalgaard | Nov. 13, 1923 |
| 1,982,862 | Erdman | Dec. 4, 1934 |
| 2,087,275 | Anderson | July 20, 1937 |
| 2,206,283 | Jacobs et al. | July 2, 1940 |